(12) United States Patent
Lu

(10) Patent No.: US 9,990,951 B2
(45) Date of Patent: Jun. 5, 2018

(54) PERPENDICULAR MAGNETIC RECORDING WITH MULTIPLE ANTIFERROMAGNETICALLY COUPLED LAYERS

(71) Applicant: Seagate Technology LLC, Cupertino, CA (US)

(72) Inventor: Bin Lu, San Ramon, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/150,378

(22) Filed: May 9, 2016

(65) Prior Publication Data

US 2017/0243605 A1   Aug. 24, 2017

Related U.S. Application Data

(60) Provisional application No. 62/298,903, filed on Feb. 23, 2016.

(51) Int. Cl.
G11B 5/66 (2006.01)
G11B 5/667 (2006.01)

(52) U.S. Cl.
CPC ............... *G11B 5/66* (2013.01); *G11B 5/667* (2013.01)

(58) Field of Classification Search
None
See application file for complete search history.

(56) References Cited

U.S. PATENT DOCUMENTS

| | | | | |
|---|---|---|---|---|
| 6,468,670 B1* | 10/2002 | Ikeda | ........ | G11B 5/66 428/611 |
| 6,777,112 B1* | 8/2004 | Girt | ........ | G11B 5/66 428/212 |
| 6,852,426 B1* | 2/2005 | Girt | ........ | G11B 5/66 428/215 |
| 7,572,526 B2* | 8/2009 | Berger | ........ | G11B 5/66 428/827 |
| 7,842,409 B2* | 11/2010 | Girt | ........ | G11B 5/66 428/828.1 |
| 8,119,263 B2* | 2/2012 | Nolan | ........ | G11B 5/65 360/135 |
| 8,168,310 B2* | 5/2012 | Bian | ........ | G11B 5/65 360/131 |
| 8,202,636 B2* | 6/2012 | Choe | ........ | G11B 5/66 428/827 |

(Continued)

OTHER PUBLICATIONS

Erol Girt and Hans Jurgen Richter. Antiferromagnetically coupled perpendicular recording media, IEEE Transactions on Magnetics, vol. 39, No. 5, pp. 2306-2310 (Sep. 2003).

*Primary Examiner* — Kevin M Bernatz

(57) ABSTRACT

Provided herein is an apparatus including a top continuous layer and a bottom continuous layer under the top continuous layer. The top continuous layer and the bottom continuous layer are antiferromagnetically coupled. A number of granular columns are under the bottom continuous layer. The number of granular columns include at least a first granular layer under the bottom continuous layer and a second granular layer also under the first granular layer. The first granular layer and the second granular layer are separated by a non-magnetic spacer. The first granular layer and the second granular layer are ferromagnetically coupled. The first granular layer is antiferromagnetically coupled to the bottom continuous layer.

13 Claims, 7 Drawing Sheets

(56) References Cited

U.S. PATENT DOCUMENTS

| | | | |
|---|---|---|---|
| 2002/0098390 A1* | 7/2002 | Do | C23C 28/021 428/827 |
| 2005/0214585 A1* | 9/2005 | Li | G11B 5/732 428/828 |
| 2006/0269792 A1* | 11/2006 | Fullerton | G11B 5/66 428/828 |
| 2007/0172705 A1* | 7/2007 | Weller | G11B 5/66 428/827 |
| 2007/0231609 A1* | 10/2007 | Ajan | G11B 5/66 428/828.1 |
| 2007/0292720 A1* | 12/2007 | Suess | B82Y 25/00 428/828.1 |
| 2008/0292907 A1* | 11/2008 | Berger | G11B 5/65 428/828 |
| 2009/0040644 A1* | 2/2009 | Lu | G11B 5/314 360/59 |
| 2009/0080110 A1* | 3/2009 | Berger | G11B 5/66 360/125.02 |
| 2010/0021768 A1* | 1/2010 | Sonobe | G11B 5/66 428/829 |
| 2010/0323220 A1* | 12/2010 | Onoue | G11B 5/65 428/800 |
| 2011/0003175 A1* | 1/2011 | Valcu | G11B 5/66 428/800 |
| 2011/0097600 A1* | 4/2011 | Onoue | G11B 5/65 428/800 |
| 2011/0311841 A1* | 12/2011 | Saito | G11B 5/65 428/848.1 |
| 2012/0028077 A1* | 2/2012 | Watanabe | G11B 5/66 428/827 |
| 2012/0251845 A1* | 10/2012 | Wang | G11B 5/66 428/827 |
| 2013/0028061 A1* | 1/2013 | Rosen | G11B 5/02 369/13.32 |
| 2013/0052485 A1* | 2/2013 | Wu | G11B 5/66 428/827 |
| 2016/0012863 A1* | 1/2016 | Kikitsu | G11B 5/746 369/13.26 |

* cited by examiner

PERPENDICULAR MAGNETIC RECORDING WITH MULTIPLE ANTIFERROMAGNETICALLY COUPLED LAYERS

CROSS-REFERENCE TO RELATED APPLICATIONS

This application claims the benefit of U.S. Provisional Patent Application Ser. No. 62/298,903 filed Feb. 23, 2016, entitled "PERPENDICULAR MEDIA".

BACKGROUND

Certain devices use disk drives with perpendicular magnetic recording media to store information. For example, disk drives can be found in many desktop computers, laptop computers, and data centers. Perpendicular magnetic recording media store information magnetically as bits. Bits store information by holding and maintaining a magnetization that is adjusted by a disk drive head. In order to store more information on a disk, bits are made smaller and packed closer together, thereby increasing the density of the bits. Therefore as the bit density increases, disk drives can store more information. However as bits become smaller and are packed closer together, the bits become increasingly susceptible to erasure, for example due to thermally activated magnetization reversal or adjacent track interference.

SUMMARY

Provided herein is an apparatus including a top continuous layer and a bottom continuous layer under the top continuous layer. The top continuous layer and the bottom continuous layer are antiferromagnetically coupled. A number of granular columnar layers are under the bottom continuous layer. The number of granular columnar layers include at least a first granular columnar layer under the bottom continuous layer and a second granular columnar layer also under the bottom continuous layer. The first granular columnar layer and the second granular columnar layer are separated by a non-magnetic spacer. The first granular columnar layer and the second granular columnar layer are antiferromagnetically coupled to the bottom continuous layer. These and other features and advantages will be apparent from a reading of the following detailed description.

DESCRIPTION

Figure 1:
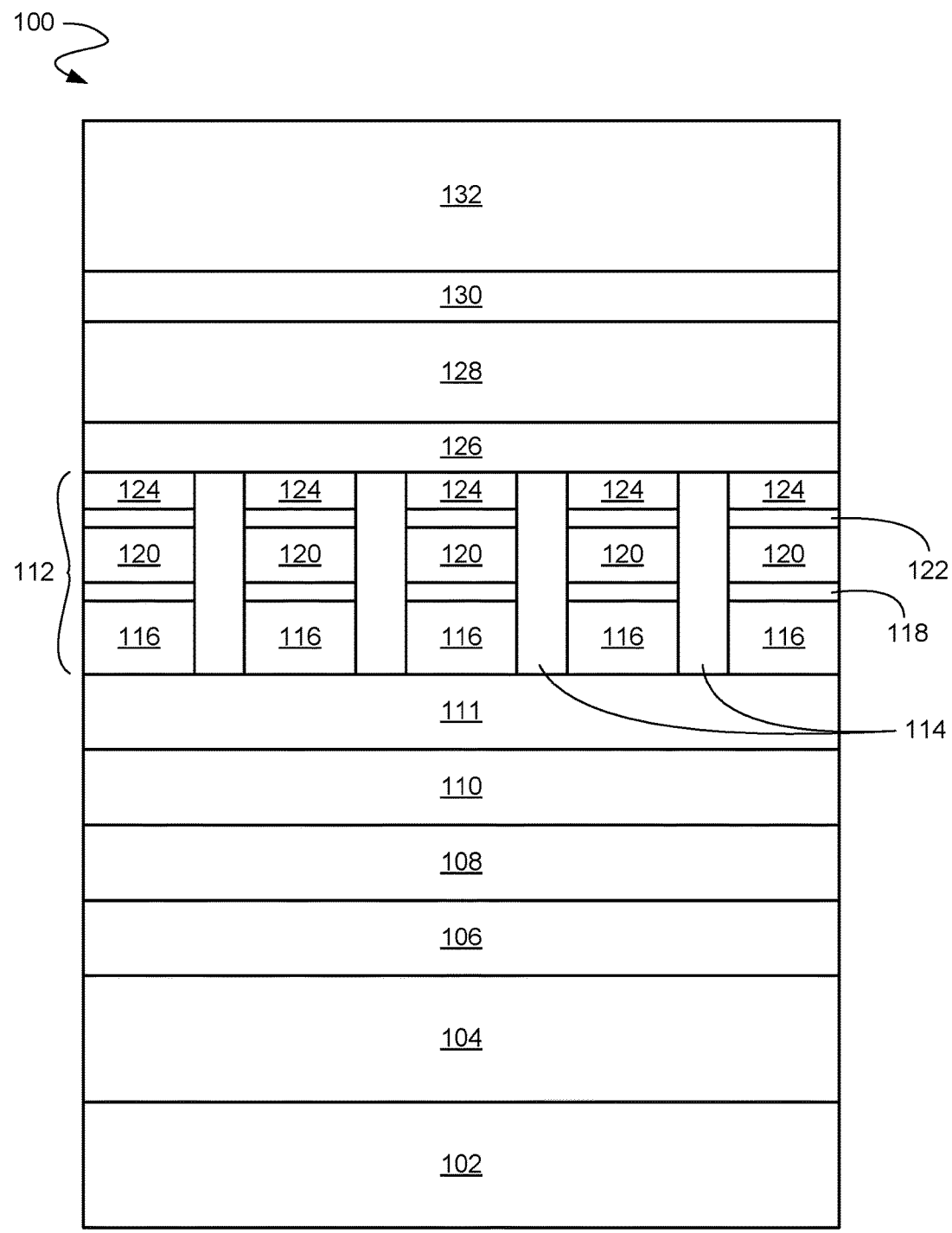
FIG. 1 shows a perpendicular magnetic recording media with antiferromagnetically coupled layers according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

As the technology of perpendicular magnetic recording media reaches maturity, it becomes increasingly difficult to continue to increase the storage capacity of recording media (e.g. disk drive disks) or to reduce the size of recording media while maintaining storage capacity. Such challenges may be overcome by increasing the bit density on the recording media. However, increasing the bit density can decrease the signal to noise ratio ("SNR") below acceptable levels. SNR can be increased by using ultra-thin magnetic films to bring the magnetic read/write head closer to the recording media. However, ultra-thin magnetic films lower the thermal stability of the grains within the bits, thereby increasing the grains' susceptibility to fluctuation and information loss. Embodiments described below address these concerns with a number of antiferromagnetically coupled continuous and granular layers.

It is understood that perpendicular magnetic recording ("PMR") media includes both granular magnetic layers and continuous magnetic layers. Granular layers include grains that are segregated in order to physically and magnetically decouple the grains from one another. Segregation of the grains may be done, for example, with formation of oxides at the boundaries between adjacent magnetic grains. As such, the segregated magnetic grains form a granular layer. When multiple granular layers stacked together they form a columnar structure, where the magnetic alloys are hetero-epitaxially grown into columns while the oxides segregate into grain (column) boundaries. PMR media may include both granular layers and continuous layers. In various embodiments, continuous layers include zero or much less segregation materials than found in the granular layers.

Referring now to FIG. 1, a PMR media 100 with antiferromagnetically coupled layers is shown according to one aspect of the present embodiments. A substrate 102 is provided. In various embodiments, the substrate 102 is disc shaped may include a non-magnetic metal, alloy, or non-metal. For example, the substrate 102 may comprise aluminum, an aluminum alloy, glass, ceramic, glass-ceramic, polymeric material, a laminate composite, or any other suitable non-magnetic material.

Overlying the substrate 102 is a continuous amorphous soft magnetic underlayer ("SUL") 104. The SUL 104 may include one or more layers of a soft magnetic material. For example, the SUL 104 may be a 10 to 2000 Å thick layer including a soft magnetic material such as Ni, NiFe, Co, CoZr, CoZrCr, CoZrNb, CoCrTaB, CoCrB, CoCrTa, CoFe, Fe, FeN, FeSiAl, FeSiAlN, FeCoC, etc. In embodiments including multiple SUL layers, the multiple SUL layers may be either ferromagnetically coupled or antiferromagnetically coupled. In addition, the multiple SUL layers may be separated by one or more layers (e.g. Ru layers).

Overlying the SUL 104 is a seed layer 106. In various embodiments the seed layer 106 includes materials with a face-centered cubic ("fcc") structure in (111) orientation. For example, the seed layer 106 may include Ni or Ni alloy. The seed layer 106 fixes the orientation for an overlying first intermediate layer 108 (e.g. bottom layer). In various embodiments, the first intermediate layer 108 is continuous and includes materials with a hexagonal close-packed ("hcp") structure in (0002) orientation that are deposited in a low pressure environment in order to provide a hcp lattice for the growth of a subsequent layer. For example, the first intermediate layer 108 may include Ru, RuCr, RuCrMn, RuCo, RuCoCr, etc. that was deposited with a pressure of 5 mTorr.

A second intermediate layer 110 (e.g. middle layer) overlies the first intermediate layer 108 (e.g. bottom layer). In various embodiments, the second intermediate layer 110 is granular and includes materials with a hcp structure in (0002) orientation that are deposited in a high pressure environment in order to provide a granular top surface for the growth of a subsequent layer. For example, the second intermediate layer 110 may include Ru that was deposited with a pressure of 100 mTorr. It is understood that the low 5 mTorr and high 100 mTorr are merely exemplary and not intended to limit the scope of the embodiments. In some embodiments, various elements (including Ru) may use different pressures or ranges of pressures to fix the hcp and granularity.

A third intermediate layer 111 (e.g. top layer) overlies the second intermediate layer 110 (e.g. middle layer). In various embodiments, the third intermediate layer 111 is granular and includes materials with a hcp structure in (0002) orientation that are deposited in a high pressure or lower pressure environment, with or without oxygen, in order to provide a granular top surface for the growth of a subsequent layer. For example, the third intermediate layer 111 may include Ru along with an oxide (e.g. $SiO_2$, $TiO_2$, $B_2O_3$, etc.).

Overlying the third intermediate layer 111 are multiple granular columns 112 that include magnetic materials with hcp structure (e.g. Co, CoCr, CoCrPt, CoCrTa, CoCrPtTa, CoCrPtRu, CoCrPtTaRu, etc.). For clarity of illustration, only a few of the multiple granular columns 112 are shown. However, it is understood that various embodiments may include any number of granular columns 112. It is also understood that the shape and size of the granular columns depicted in FIG. 1 is for illustration purposes. The actual shape and size of the granular columns may vary from each other.

In various embodiments, each of the granular columns 112 are separated by boundaries 114 that are non-magnetic spacers. In various embodiments, the boundaries 114 may be, for example, oxides (e.g. $SiO_2$, $TiO_2$, $B_2O_3$, etc.) or combinations of oxides. The boundaries 114 segregate the granular columns 112 by physically separating and therefore magnetically decoupling the granular columns 112 from each other. As such, the granular columns 112 parallel and horizontal to each other with respect to overlying and underlying layers, and the magnetization of the granular columns 112 is perpendicular to the overlying and underlying layers. Therefore the granular columns 112 are in the same horizontal plain.

Each of the multiple granular columns 112 may themselves include granular layers. For example, in some embodiments each of the granular columns 112 may include a first magnetic granular layer 116 overlying the third intermediate layer 111, a first break layer 118 overlying the first magnetic granular layer 116, and second magnetic granular layer 120 overlying the first break layer 118, a second break layer 122 overlying the second magnetic granular layer 120, and a third magnetic granular layer 124 overlying the second break layer 122. In various embodiments, first magnetic layer 116, second magnetic granular layer 120, and third magnetic granular layer 124 are ferromagnetically coupled. Other embodiments may include various numbers of granular layers with or without various numbers of break layers as well as various couplings of layers.

In some embodiments the first break layer 118 and the second break layer 122 may be 0-20 Å thick, and include weak magnetic or non-magnetic materials (e.g. Co, Cr, Pt, Ru, B, $SiO_2$, $TiO_2$, or other oxides or alloys). The material and thickness of the first break layer 118 and the second break layer 122 are selected to induce ferromagnetic coupling between the first granular layer 116 and second granular magnetic layer 120 as well as the second granular magnetic layer 120 and the third granular magnetic layer 124 of the multiple granular columns 112. In addition, the ferromagnetic coupling strength between layers may be adjusted by controlling the thickness of the break layer between the ferromagnetically coupled layers. Both granular layers and break layers include segregation materials, such as oxides (e.g. $SiO_2$, $TiO_2$, $B_2O_3$, etc. or their combinations). The volume fractions of segregation materials inside granular magnetic layers range from 5% to 40%. The volume fractions of segregation materials inside break layers range from 0 to 40%. The segregation materials (e.g. oxides) form a non-magnetic grain (column) boundaries 114 inside the multiple granular columns 112.

In some embodiments the first magnetic layer 116 may be a harder magnetic layer (e.g. Hk=20 kOe), the second magnetic layer 120 may be a medium magnetic layer (e.g. Hk=15 kOe), and the third magnetic layer 124 may be a softer magnetic layer (e.g. Hk=10 kOe). It is understood that the values indicated with respect to layers 116, 120, and 124 are merely exemplary and not intended to limit the scope of the embodiments. The terminology harder, medium, and softer is intended to indicate the relative magnetic hardness of layers 116, 120, and 124 to each other. The magnetic layers 116, 118 and 120 inside granular columns 112 include magnetic materials with hcp structure (e.g. Co, CoCr, CoCrPt, CoCrTa, CoCrPtTa, CoCrPtRu, CoCrPtTaRu, etc.).

A first non-magnetic antiferromagnetic ("AFC") spacer layer 126 overlies the multiple granular columns 112. In various embodiments the first AFC spacer layer 126 is a 1-10 Å thick continuous layer that may include, for example, Ru, Rh, or alloys thereof. The material and thickness of the first AFC spacer layer 126 are selected to induce antiferromagnetic coupling between the third magnetic layer 124 (e.g. a top surface) of the multiple granular columns 112 to a first continuous layer 128, overlying the first AFC spacer layer 126.

It is understood that varying the thickness and/or material of the first AFC spacer layer 126 may induce either ferromagnetic coupling or antiferromagnetic coupling between the first continuous layer 128 and the third magnetic layer 124 of the multiple granular columns 112. For example, if a predetermined thickness of the AFC spacer layer 126 induces antiferromagnetic coupling, ferromagnetic coupling may instead be induced by either increasing or decreasing the thickness of the AFC spacer layer 126, in various embodiments. In addition, the coupling strength between the third magnetic layer 124 and the first continuous layer 128 may be adjusted by controlling the thickness of the first AFC spacer layer 126.

A second non-magnetic AFC spacer layer 130 overlies the first continuous layer 128. In various embodiments the second AFC spacer layer 130 is a 1-10 Å thick continuous layer that may include, for example, Ru, Rh, or alloys thereof. The material and thickness of the second AFC spacer layer 130 are selected to induce antiferromagnetic coupling between the first continuous layer 128 to a second continuous layer 132, overlying the second AFC spacer layer 130. It is understood that varying the thickness and/or material of the second AFC spacer layer 130 may induce either ferromagnetic coupling or antiferromagnetic coupling between the second continuous layer 132 and the first continuous layer 128. In addition, the coupling strength between the first continuous layer 128 and the second continuous layer 132 may be adjusted by controlling the thickness of the second AFC spacer layer 130.

It is understood that one or more layers may be referred to as a layer stack. For example, a combination of the substrate 102, the SUL 104, the seed layer 106, the first intermediate layer 108, and the second intermediate layer 110 may be referred to as a layer stack. Various other combinations of any of the layers described in embodiments may also be referred to as layer stacks.

In the present embodiment, the first continuous layer 128 is a bottom continuous layer with respect to the second continuous layer 132 which is a top continuous layer. In various embodiments, the first continuous layer 128 and the second continuous layer 132 may include Co—Pt alloys. In some embodiments, the Pt atomic percentage may be in the range of 0-45%. The first continuous layer 128 and the second continuous layer 132 may also include multiple other elements, such as, Cr, Ru, Ni, Cu, B, C, etc as dopants or alloying compounds. In various embodiments the multiple other elements may be transition metals with an atomic percentage of 0-30%. The first continuous layer 128 and the second continuous layer 132 may also include a small amount of multiple segregation materials, such as, SiO2, TiO2, B2O3, etc. In different embodiments, the first continuous layer 128 and the second continuous layer 132 may be the same material or different materials.

Figure 2:
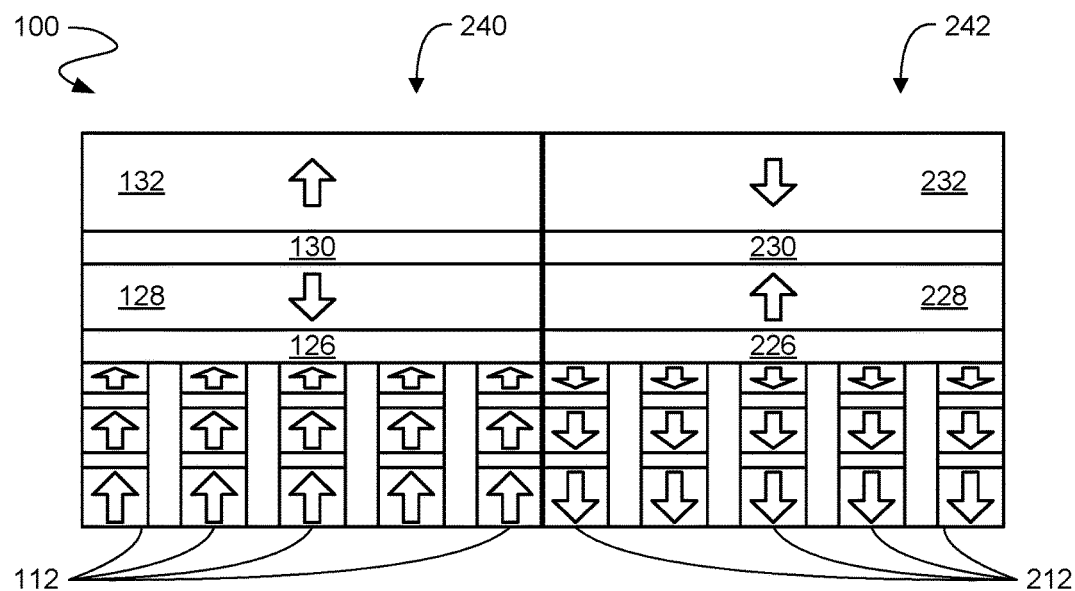
FIG. 2 shows the perpendicular magnetic recording media including a first bit and a second bit according to one aspect of the present embodiments.

Referring now to FIG. 2, the perpendicular magnetic recording media 100 including a first bit 240 and a second bit 242 is shown according to one aspect of the present embodiments. The first bit 240 includes the granular columns 112, the first AFC spacer layer 126, the first continuous layer 128, the second AFC spacer layer 130, and the second continuous layer 132. For clarity of illustration, other layers of the perpendicular magnetic recording media 100 are not illustrated, but are understood to be present (see for example FIG. 1). As such, a number of the granular columns 112 overly an underlying layer stack.

In addition for clarity of illustration, the magnetizations of the grains or layers are depicted by up and down arrows. Therefore, the plurality of granular columns 112, the first continuous layer 128, and the second continuous layer 132 are perpendicularly magnetically oriented to the layer stack, as depicted by the up and down arrows. The granular columns 112 and the second continuous layer 132 include the same magnetization orientation, as indicated by the up arrow. The first continuous layer 128 includes an opposite magnetization orientation, as indicated by the down arrow. It is understood that magnetization orientations may also be referred to as positive (+), negative (−), north pole, south pole, etc. However, it is understood that such magnetic representations are simplifications indicating, for example, the general location from which magnetic field lines emerge and reenter.

The second bit 242 includes corresponding layers to the layers in the first bit 240. As such the second bit 242 includes the second bit layers: granular columns 212, AFC spacer layer 226, first continuous layer 228, second AFC spacer layer 230, and second continuous layer 232. For clarity of illustration, other layers are not illustrated, but are understood to be present.

The layers of the first bit 240 magnetically orient in response to one another, and the layers of the second bit 242 magnetically orient in response to one another. Therefore, the magnetizations (figuratively depicted with up and down arrows) of the layers of the first bit 240 are independent of the magnetizations (figuratively depicted with up and down arrows) of the layers of the second bit 242. As such, the first bit 240 may have different magnetizations than the second bit 242. Alternatively, the first bit 240 may have the same magnetizations (not shown) of the second bit 242.

As such, in a non-limiting example the first bit 240 may be referred to as a first region and the second bit 242 may be referred to as a second region. The granular columns 112 in the first region may include a first top magnetic granular layer, a first middle magnetic granular layer and a first bottom magnetic granular layer under a bottom continuous layer in the first region (e.g. the first continuous layer 128). The granular columns 212 in the second region may include a second top magnetic granular layer, second middle magnetic granular layer and a second bottom magnetic granular layer under the bottom continuous layer in the second region (e.g. the first continuous layer 228). Therefore, the first top, first middle, first bottom, second top, second middle and, second bottom magnetic granular layers are horizontally beside each other in a same horizontal plain with respect to the bottom continuous layer. In addition, the first top granular layer is antiferromagnetically coupled to the bottom continuous layer in the first region, as indicated by the arrows. The second top magnetic granular layer is antiferromagnetically coupled to the bottom continuous layer in the second region, as indicated by the arrows. Furthermore, the arrows illustrate that the first region and the second region may include different magnetization orientations. As such, the first region and the second region magnetically orient independently from each other, and may have the same or different magnetizations.

Figure 3:
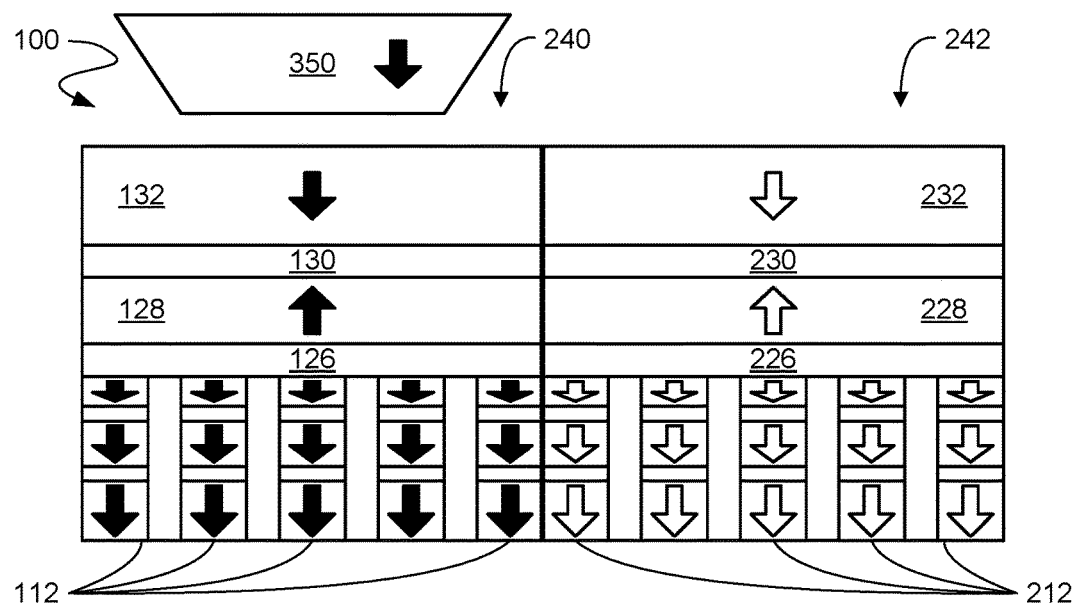
FIG. 3 shows the first bit magnetically responding to a read/write head according to one aspect of the present embodiments.
Figure 4:
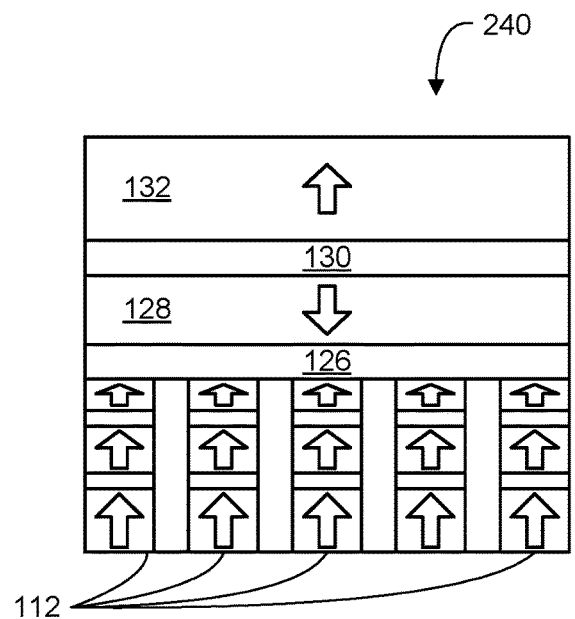
FIGS. 4, 5, 6, and 7 show the interaction of the layers of the first bit magnetically responding in sequential order to a write operation according to one aspect of the present embodiments.
Figure 5:
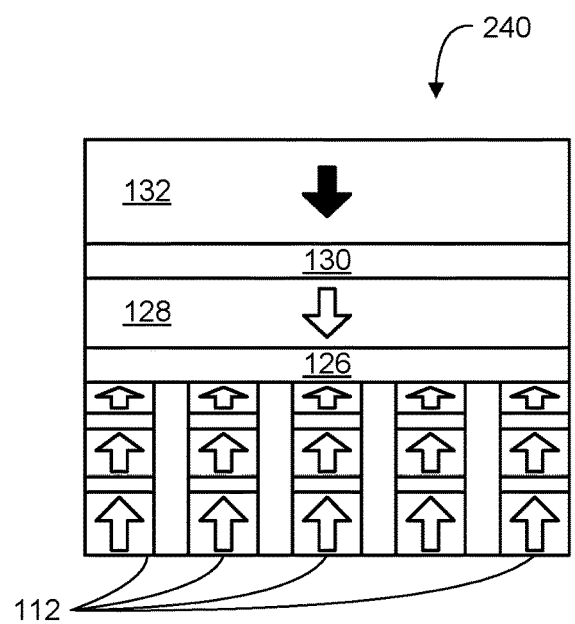
Figure 6:
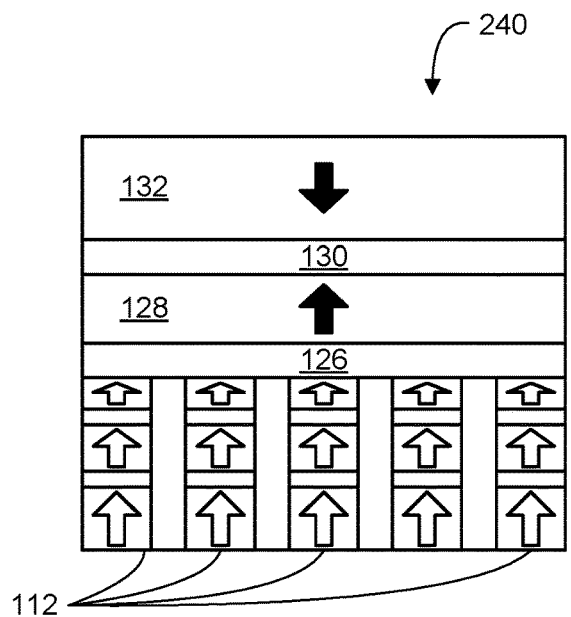
Figure 7:
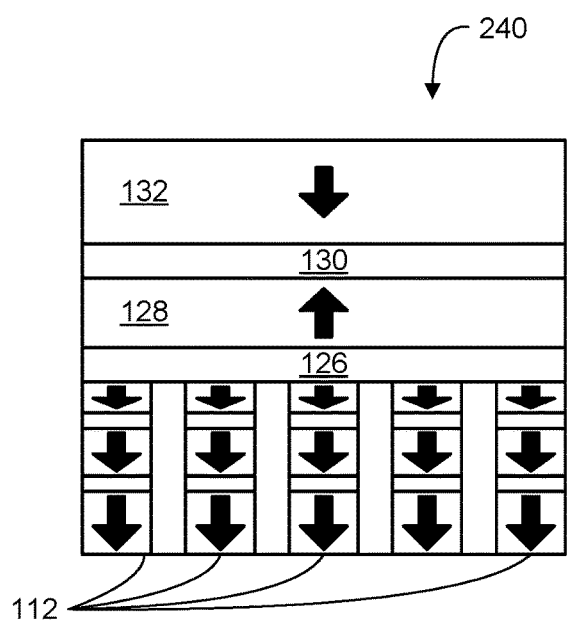

Referring now to FIG. 3, the first bit 240 magnetically responding to a read/write head 350 is shown according to one aspect of the present embodiments. It is understood that in various embodiments the read/write head 350 may be a read head or a write head, and the various embodiments may therefore include a separate read head and a separate write head. Further embodiments may include one or more read heads, write heads, and/or read/write heads.

During a writing operation, the read/write head 350 generates a magnetic field strong enough to orient the magnetization of the second continuous layer 132 to the desired direction. In the illustrated example, the magnetization of the second continuous layer 132 is therefore switched, as indicated by the black down arrow. In response to the antiferromagnetic coupling between the first continuous layer 128 and the second continuous layer 132 as well as the magnetic field of the read/write head 350, the magnetization of the first continuous layer 128 is switched. Furthermore, in response to the AFC coupling between the first continuous layer 128 and the multiple granular columns 112 as well as the magnetic field of the read/write head 350 the multiple granular columns 112 are also switched, as indicated by the corresponding black up and black down arrows.

During a reading operation, the read/write head 350 reads the signals carried by the magnetization of the second continuous layer 132, which matches the magnetization of the multiple granular columns 112. In the illustrated example, the magnetizations of the second continuous layer 132 and the multiple granular columns 112, as indicated by the black down arrows, are the same because of their antiferromagnetic couplings with the first continuous layer 128, with an opposite magnetic magnetization indicated by the black up arrow.

In various embodiments, the second continuous layer 132 is thicker than the first continuous layer 128, has higher magnetization, or has a higher product of thickness and saturation magnetization ("Mst"). As a result of the higher Mst, the moment generated by the second continuous layer 132 is stronger than the moment generated by the first continuous layer 128. Therefore, the read/write head 350 can detect the moment of the second continuous layer 132 because it is not totally canceled out by the opposite moment of the first continuous layer 128. As a result, the read/write head 350 can perform read operations on the relatively closer second continuous layer 132 (as compared to the relatively further multiple granular columns 112).

For example, if the first continuous layer 128 fully canceled out the moment of the second continuous layer 132, then the read/write head 350 would need to read the multiple granular columns 112. However, the multiple granular columns 112 are much further away from the read/write head 350. As a result, read operations would be relatively more blurred, with lower resolution.

On the other hand, in embodiments presented herein the magnetization of the second continuous layer 132 is not canceled by the magnetization of the first continuous layer 128. Therefore, the read/write head 350 interacts with the closer second continuous layer 132. Due to AFC coupling between the second continuous layer 132 and first continuous layer 128, the second continuous layer 132 has a higher switching field than the case when it is ferromagnetically coupled to the first continuous layer 128. In addition, the second continuous layer 132 has a lower switching field strength than the multiple granular columns 112, thereby making write operations relatively easier. However, the robustness of magnetic information is maintained because the second continuous layer 132 is coupled to (through the first continuous layer 128) and matches the magnetization of the magnetically harder multiple granular columns 112. For example, in the illustrated embodiment the second continuous layer 132 (with a magnetization represented by an up arrow) is antiferromagnetically coupled to the first continuous layer 128, and the first continuous layer 128 is antiferromagnetically coupled to the multiple granular columns 112 (with a magnetization represented by an up arrow, matching the magnetization of the second continuous layer).

For clarity of illustration, the read/write head 350 is figuratively depicted interacting with only the first magnetic bit 240. However, it is understood that the read/write head 350 may be relatively much larger than the first magnetic bit 240, and the magnetic head 350 may simultaneously interact with many magnetic grains in adjacent bits.

Referring now to FIGS. 4, 5, 6, and 7, the interaction of the layers of the first bit 240 magnetically responding in sequential order to a write operation are shown according to one aspect of the present embodiments. At the beginning of the write operation (see FIG. 4) and before a reversing magnetic field is turned on from a read/write head (not shown) the second continuous layer 132 may have, for example, a magnetization indicated by the up arrow.

As previously discussed, the second continuous layer 132 is antiferromagnetically coupled to the first continuous layer 128, with the second AFC spacer layer 130 in-between. Due to the antiferromagnetic coupling, the first continuous layer 128 has a magnetization which is opposite to the second continuous layer 132, and indicated by the down arrow.

In addition, the first continuous layer 128 is antiferromagnetically coupled to the multiple granular columns 112, with the first AFC spacer layer 126 in-between. Due to the antiferromagnetic coupling, the multiple granular columns 112 have a magnetization which is opposite to the first continuous layer 128, and indicated by the up arrows.

In response to a reversing magnetic field from a read/write head (not shown), the second continuous layer 132 changes magnetization orientation. In the present example, the magnetization of the second continuous layer 132 switches (see FIG. 5), as indicated by the black down arrow. In response to the switching of the magnetization of the second continuous layer 132, the magnetization of the first continuous layer 128 switches (see FIG. 6), as indicated by the black up arrow. This is due to the AFC coupling between the two layers and that this coupling strength overcomes the writer field. In addition, in response to the switching of the magnetization of the first continuous layer 128 and the writer reversing field, the magnetizations of the multiple granular columns 112 switch (see FIG. 7), as indicated by the black down arrows. As a result, the whole bit is reversed in a cascading fashion or domino effect.

Figure 8:
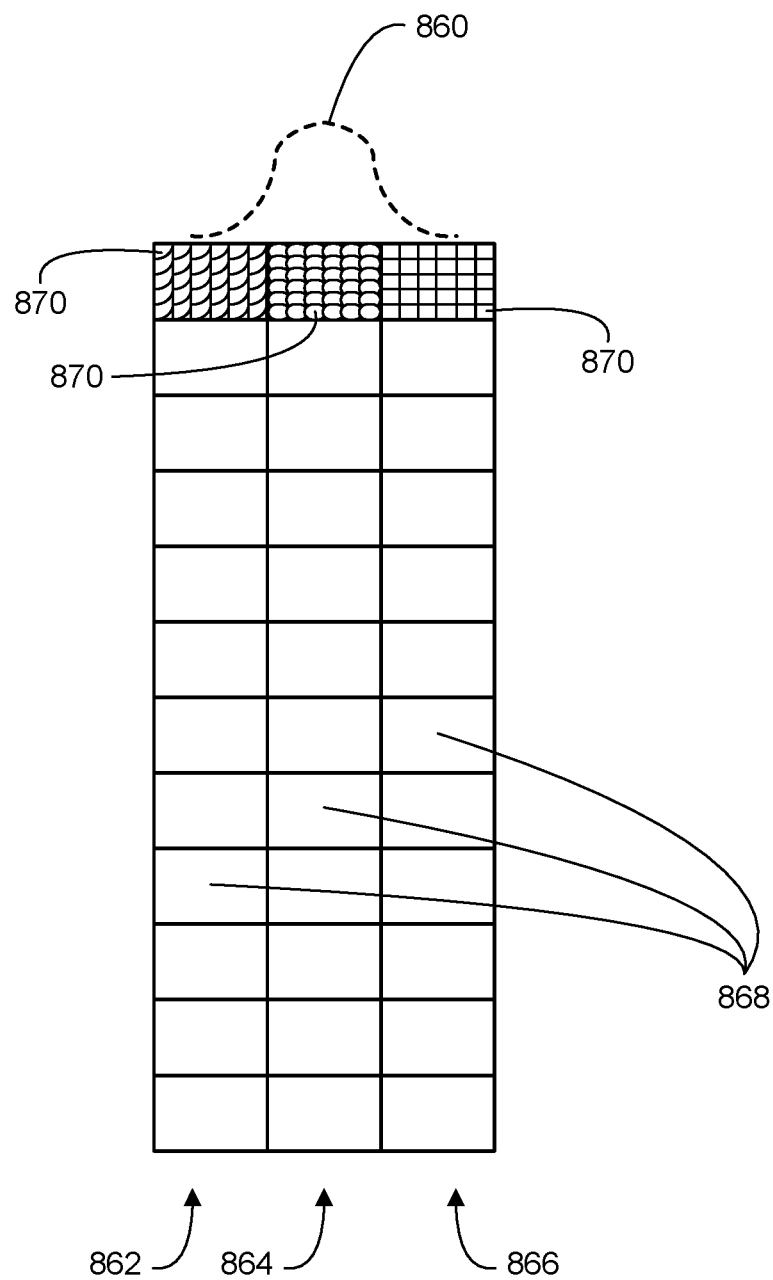
FIG. 8 shows a figurative representation of a profile of a magnetic writing field interacting with a first track, a second track, and a third track according to one aspect of the present embodiments.

Referring now to FIG. 8, a figurative representation of a profile of a magnetic writing field 860 interacting with a first track 862, a second track 864, and a third track 866 is shown according to one aspect of the present embodiments. Each of the tracks (862, 864, 866) include a number of bits 868, and each of the bits 868 include a number of grains 870. For clarity of illustration, the bits 868 in the tracks (862, 864, 866) are figuratively illustrated using equal rectangles. It is understood that in various embodiments, the size and shape of the bits 868 may be different between bits in the same track or different tracks. In addition, for clarity of illustration the grains 870 within separate bits 868 are figuratively illustrated using different shapes. In addition, the grains 870 are only illustrated in one bit per track, however, it is understood that the grains 870 are present in numerous bits per track.

When recording information to a disk, the grains 870 within one of the bits 868 are uniformly magnetically oriented with the magnetization orientation either pointing up (out of the surface of FIG. 8) or pointing down (into the surface of FIG. 8). Thus, information can be stored to and read back from each bit by reading/writing the uniform magnetization of the grains 870 within the bits 868. As such, different bits have a positive or negative magnetization, that is used to store information on a disk.

However the magnetic writing field 860 can overlap adjacent tracks, thereby creating adjacent track interference. For example, the magnetic writing field 860 may be writing to second track 864. While writing to the second track 864, the magnetic writing field 860 may overlap a portion of the first track 862 and a portion of the third track 866. As a result of the overlap, a portion of the bits 868 in the first track 862 and the third track 866 are exposed to the magnetic writing field 860.

Although the magnetic writing field 860 is weaker in the overlapped regions, the grains 870 within the overlapped regions of the bits 868 have an increased likelihood of having their magnetization switched. Thus, the grains in the bits 868 in the first track 862 and the third track 866 may be undesirably affected (e.g. written) by the writer field during the writing process of writing the grains 870 in the second track 864. If enough of the grains 870 within the bit 868 include undesired magnetizations, the disk drive may not be able to interpret the intended magnetization of the bit 868, thereby losing information.

Due to AFC coupling between the first and second continuous layers, the embodiments presented herein unexpectedly reduce adjacent track interference, by increasing the robustness (e.g. resistance to erasure) of adjacent tracks, thereby reducing the likelihood that the bits 868 in adjacent tracks (e.g. the first track 862 and the third track 866) will be affected by overlapping magnetic write fields (e.g. during write operations to the second track 864). In addition, the embodiments presented herein unexpectedly reduce spontaneous fluctuation of the grains 870, for example caused by thermal fluctuations. As a result of reducing adjacent track interference, tracks in various embodiments may be packed closer together, thereby increasing the cross-track density. By increasing the cross-track density, more information may be stored in the same area of a disk drive.

Figure 9:
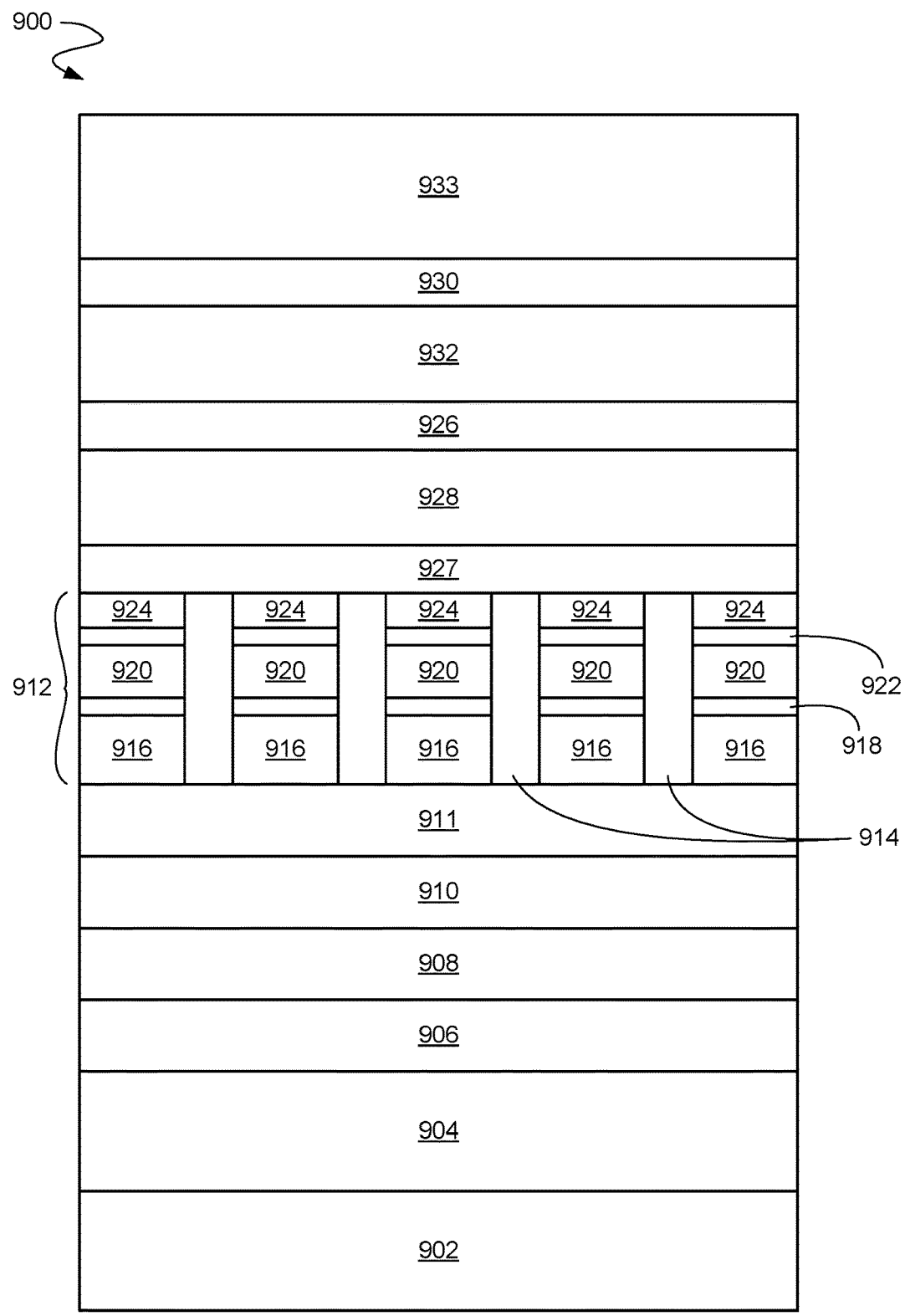
FIG. 9 shows a perpendicular magnetic recording media with antiferromagnetically coupled layers and ferromagnetically coupled layers according to one aspect of the present embodiments.

Referring now to FIG. 9, a perpendicular magnetic recording media 900 with antiferromagnetically coupled layers and ferromagnetically coupled layers is shown according to one aspect of the present embodiments. The magnetic recording media 900 is similar to the media described in FIG. 1 from the substrate up to the granular columns. Thus, a substrate 902 is provided. Overlying the substrate 902 is a SUL 904. Overlying the SUL 904 is a seed layer 906. Overlying the seed layer 906 is a first intermediate layer 908. A second intermediate layer 910 overlies the first intermediate layer 908. A third intermediate layer 911 overlies the second intermediate layer 910. Overlying the third intermediate layer 911 are multiple granular columns 912. Boundaries 914 segregate the granular columns 912.

In some embodiments each of the granular columns 912 may include a first magnetic layer 916 overlying the third intermediate layer 911, a first break layer 918 overlying the first magnetic layer 916, a second magnetic layer 920 overlying the first break layer 918, a second break layer 922 overlying the second magnetic layer 920, and a third magnetic layer 924 overlying the second break layer 922. In various embodiments, first magnetic layer 916, second magnetic layer 920, and third magnetic layer 924 are ferromagnetically coupled through the corresponding first break layer 918 and the second break layer 922. In various embodiments, the first break layer 918 and the second break layer 922 are non-magnetic spacer layers.

Unlike FIG. 1, the magnetic recording media 900 includes a third break layer 927 overlying the multiple granular columns 912, and a first continuous layer 928 overlying the third break layer 927. The third break layer 927 is illustrated as continuous, however in various embodiments the third break layer 927 may be either granular or continuous. The third break layer 927 may be 0-20 Å thick, and could be weak magnetic or non-magnetic. The third break layer may include materials, such as Co, Cr, Pt, Ru, B, $SiO_2$, $TiO_2$, or other oxides or alloys. The material and thickness of the third break layer 927 are selected to induce ferromagnetic coupling between the first continuous layer 928 and the third magnetic layer 924 of the multiple granular columns 912. In various embodiments, the third break layer 927 is a non-magnetic spacer layer.

A first non-magnetic AFC spacer layer 926 overlies the first continuous layer 928. In various embodiments the first AFC spacer layer 926 is continuous and may include Ru. The first AFC spacer layer 926 induces antiferromagnetic coupling between the first continuous layer 928 to a second continuous layer 932, overlying the first AFC spacer layer 926.

A second non-magnetic AFC spacer layer 930 overlies the second continuous layer 932. In various embodiments the second AFC spacer layer 930 is continuous and may include Ru. The second AFC spacer layer 930 induces antiferromagnetic coupling between the second continuous layer 932 to a third continuous layer 933, overlying the second AFC spacer layer 930. In some embodiments, the AFC spacer layer 930 may be sandwiched between two additional continuous layers (not shown) with high magnetization. The two additional continuous layers may include, for example, Co, CoCr, Co—Pt, Co—Cr—Pt alloys, or Co—Cr—Pt—B, and the two additional continuous layers may include other dopants of transition metals. Furthermore, the two additional continuous layers may be the same or different compositions. In some embodiments, the magnetization of the two additional continuous layers may be higher than the two coupled layers (e.g. the second continuous layer 932 to a third continuous layer 933). It is understood that the two additional continuous sandwiching layers may be applied to all of the AFC spacers described herein (e.g. the first AFC spacer layer 126 and the second AFC spacer layer 130).

In the present embodiment, the first continuous layer 928 is a bottom continuous layer with respect to the second continuous layer 932 which is a middle continuous layer. In addition, the third continuous layer 933 is a top continuous layer with respect to the second continuous layer 932. In various embodiments, the first continuous layer 928, the second continuous layer 932, and the third continuous layer 933 may include Co—Pt alloys. In some embodiments, the Pt atomic percentage may be in the range of 0-50%. The first continuous layer 928, the second continuous layer 932, and the third continuous layer 933 may also include multiple other elements as dopants or alloying compounds, or even a small amount of oxides, such as $SiO_2$, $TiO_2$, $B_2O_3$, etc. In various embodiments the multiple other elements may be transition metals with an atomic percentage of 0-30%. In different embodiments, the first continuous layer 928, the second continuous layer 932, and the third continuous layer 933 may be the same material or different materials.

Figure 10:
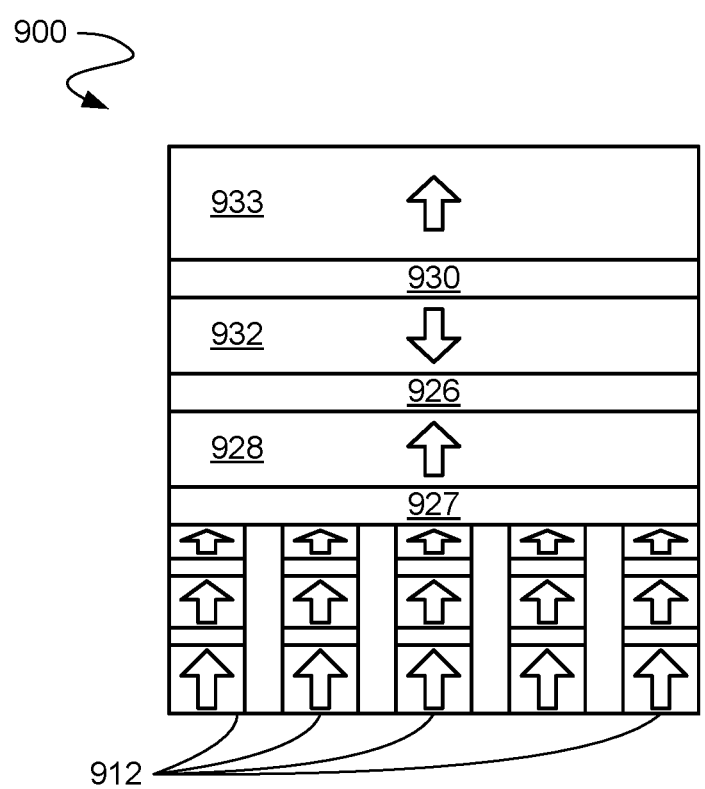
FIG. 10 shows the relative magnetizations of the perpendicular magnetic recording media of FIG. 9 according to one aspect of the present embodiments.

Referring now to FIG. 10, the relative magnetizations of the perpendicular magnetic recording media 900 are shown according to one aspect of the present embodiments. The multiple granular columns 912 and the first continuous layer 928 are ferromagnetically coupled and share the same magnetization, represented by the up arrows. The second continuous layer 932 is antiferromagnetically coupled to the first continuous layer 928 and has an oppose magnetization to the first continuous layer 928, represented by the down arrow. The third continuous layer 933 is antiferromagnetically coupled to the second continuous layer 932 and has an opposite magnetization to the second continuous layer 932, represented by the up arrow.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A perpendicular magnetic recording medium comprising:
    a layer stack, including a substrate;
    a plurality of granular columns overlying the layer stack, wherein a granular column of the plurality of granular columns includes a plurality of magnetic layers, each magnetic layer of the plurality of magnetic layers having a different magnetic hardness from the other magnetic layers of the plurality of magnetic layers;
    a first non-magnetic spacer layer overlying the plurality of granular columns;
    a first continuous layer overlying the first non-magnetic spacer layer, wherein the first continuous layer is magnetic and antiferromagnetically coupled to a top surface of the plurality of granular columns;
    a second non-magnetic spacer layer overlying the first continuous layer; and
    a second continuous layer overlying the second non-magnetic spacer layer, wherein
        the second continuous layer is magnetic and antiferromagnetically coupled to the first continuous layer, and
        the second continuous layer has a lower switching field strength than the plurality of granular columns and generates a moment that is stronger than a moment generated by the first continuous layer.

2. The perpendicular magnetic recording medium of claim 1, wherein
    the plurality of granular columns are parallel to each other,
    the plurality of granular columns are perpendicular to the layer stack,
    the plurality of granular columns have a magnetic anisotropy perpendicular to the layer stack, and
    the plurality of granular columns include a multiple layer structure.

3. The perpendicular magnetic recording medium of claim 1, wherein the layer stack further includes
    a soft magnetic underlayer ("SUL") overlying the substrate;
    a seed layer overlying the SUL, wherein the seed layer includes a face-centered cubic structure;
    a first hexagonal close-packed layer overlying the seed layer;
    a second hexagonal close-packed layer overlying the first hexagonal close-packed layer; and
    a third hexagonal close-packed layer overlying the second hexagonal close-packed layer.

4. The perpendicular magnetic recording medium of claim 1, wherein a granular column of the plurality of granular columns includes:
    a first magnetic layer;
    a first break layer overlying the first magnetic layer;
    a second magnetic layer overlying the first break layer;
    a second break layer overlying the second magnetic layer; and
    a third magnetic layer overlying the second break layer, wherein
        the first magnetic layer is magnetically harder than the second magnetic layer, and
        the second magnetic layer is magnetically harder than the third magnetic layer.

5. The perpendicular magnetic recording medium of claim 4, wherein
    the first magnetic layer is ferromagnetically coupled to the second magnetic layer, and
    the second magnetic layer is ferromagnetically coupled to the third magnetic layer.

6. The perpendicular magnetic recording medium of claim 1, wherein the first continuous layer magnetically orients in response to the second continuous layer.

7. The perpendicular magnetic recording medium of claim 1, wherein the plurality of granular columns magnetically orients in response to the first continuous layer.

8. A perpendicular magnetic recording medium comprising:
    a top continuous layer;
    a bottom continuous layer under the top continuous layer, wherein the top continuous layer and the bottom continuous layer are antiferromagnetically coupled;
    a plurality of granular columns, wherein a granular column of the plurality of granular columns includes:
        a first granular layer under the bottom continuous layer;
        a second granular layer having a different magnetic hardness than the first granular layer under the first granular layer, wherein
            the top continuous layer, the bottom continuous layer, and the plurality of granular columns are magnetic,
            the top continuous layer generates a moment that is stronger than a moment generated by the bottom continuous layer and has a lower switching field strength than the plurality of granular columns,
            the first granular layer and the second granular layer are separated by a non-magnetic spacer and are ferromagnetically coupled, and
            the first granular layer is antiferromagnetically coupled to the bottom continuous layer; and a layer stack including a substrate under the second granular layer.

9. The perpendicular magnetic recording medium of claim 8, wherein the top continuous layer, the bottom continuous layer, and the plurality of granular columns are perpendicularly magnetically oriented with respect to the substrate.

10. The perpendicular magnetic recording medium of claim 8, further comprising
   a top ruthenium layer under the plurality of granular columns;
   a middle ruthenium layer under the top ruthenium layer;
   a bottom ruthenium layer under the middle ruthenium layer;
   a seed layer under the bottom ruthenium layer;
   a soft magnetic layer under the seed layer; and
   the substrate under the soft magnetic layer.

11. The perpendicular magnetic recording medium of claim 8, further comprising
   a first ruthenium layer between the top continuous layer and the bottom continuous layer; and
   a second ruthenium layer between the bottom continuous layer and the plurality of granular columns.

12. The perpendicular magnetic recording medium of claim 8, wherein the bottom continuous layer magnetically orients in response to the top continuous layer.

13. The perpendicular magnetic recording medium of claim 8, wherein the plurality of granular columns magnetically orient in response to the bottom continuous layer.

* * * * *